March 13, 1951 C. E. OATES 2,544,853
THROTTLE REVERSING LINKAGE
Filed April 9, 1949 2 Sheets-Sheet 1

INVENTOR:
CHARLES E. OATES
BY
Herbert E. Metcalf
Attorney

March 13, 1951     C. E. OATES     2,544,853
THROTTLE REVERSING LINKAGE
Filed April 9, 1949     2 Sheets-Sheet 2
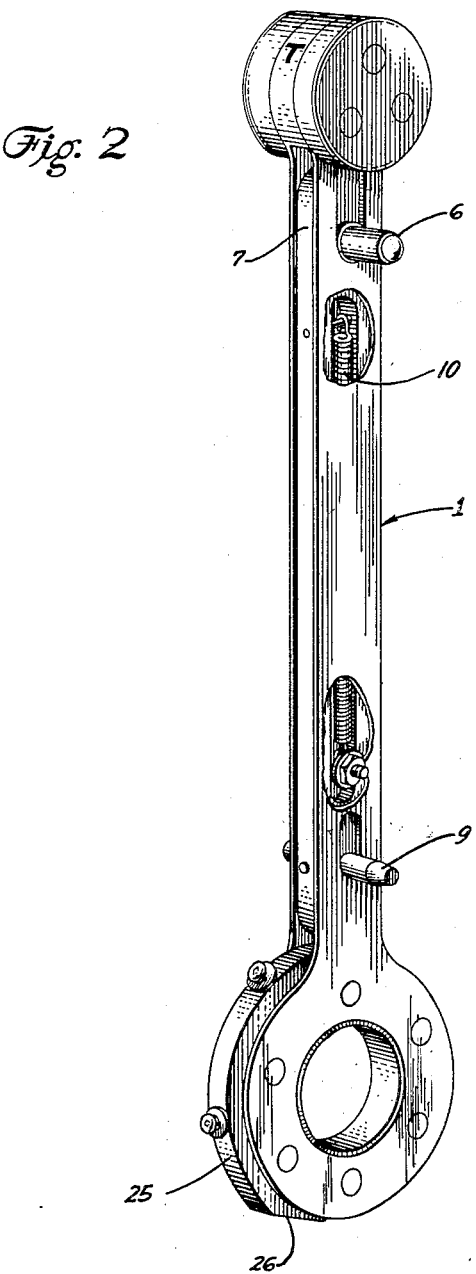
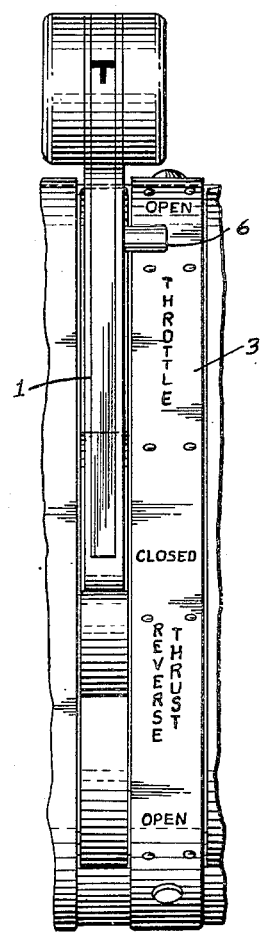
INVENTOR.
CHARLES E. OATES Patented Mar. 13, 1951

2,544,853

UNITED STATES PATENT OFFICE 2,544,853

THROTTLE REVERSING LINKAGE

Charles E. Oates, Gardena, Calif., assignor to Northrop Aircraft, Inc., Hawthorne, Calif., a corporation of California Application April 9, 1949, Serial No. 86,533

7 Claims. (Cl. 74—471)

1

This invention relates to airplane controls, and more particularly, to an improved throttle control for airplanes having reversible pitch propellers.

Since reversible pitch propellers have been adopted for braking purposes on an airplane, by applying a reverse thrust force, it has become more or less customary to provide the pilot's engine throttle lever or levers with a reverse thrust range entirely separate from the forward thrust range. This additional range is customarily provided to the rear of the normal "throttle closed" position, and means are provided for automatically turning the propeller blades into their reverse pitch position after moving the throttle lever into the reverse thrust range. As the throttle lever is then moved farther into the reverse thrust range, the engine throttle is opened to increase the engine speed with the propeller in reverse pitch. This arrangement is considered more desirable than keeping the original single throttle lever range and adding a separate switching means for propeller pitch reversing because it requires the manipulation of only one control instead of two, and is therefore faster and easier to operate, with little or no chance for pilot error. It also actuates the propeller reversing system at the point where proper engine speed exists, therefore minimizing the chances of malfunction of the propeller or engine.

One commonly used linkage for providing a pilot's throttle lever with a closed position on each side of which the engine throttle will be opened, makes use of a push-pull rod connected to an arm of the pilot's throttle lever and to a quadrant or pulley which is connected to operate the engine throttle lever. At the "throttle closed" position, the two ends of the push-pull rod and the center of rotation of the pilot's throttle lever fall in a straight line so that when the pilot's lever is moved through this position, the push-pull rod will reverse its direction of motion to change from a "throttle closing" operation to a "throttle opening" operation.

Using a device of this type, it is very difficult to achieve a linear relation between pilot's throttle lever movement and engine throttle shaft movement. This linearity of movement is required, in most engines, to obtain equal engine response for a given increment of pilot's throttle lever movement at any position within the range of this lever.

Another disadvantage of a dead-center linkage as described above is the problem of back-

2 lash involved when the push-pull rod motion is reversed. This factor adds to the already large distance required for the pilot's throttle lever to be moved, when near or at dead center, to effect a noticeable change in engine speed.

It is an object of the present invention to provide a reversing means for a pilot's throttle control wherein a substantially linear relation exists between the pilot's throttle lever and the engine's throttle control system, throughout both the forward and reverse thrust ranges of the pilot's lever.

Another object of this invention is to provide a throttle lever reversing system wherein backlash is reduced to a negligible amount.

In broad terms, the present invention comprises two driving members connected to rotate oppositely to each other when a driven member is rotated, and a lever connectable with one of these driving members throughout one range of lever positions and connectable with the other driving member throughout another range of lever positions.

The invention may be more readily understood by reference to the accompanying drawings, wherein:

Figure 2 is a perspective view drawn on a larger scale, showing the lever assembly, only, of Figure 1.

Figure 3 is a top view in elevation of the control stand shown in Figure 1 and taken from an angle as indicated by the arrow 3 in Figure 1.

Figure 1:
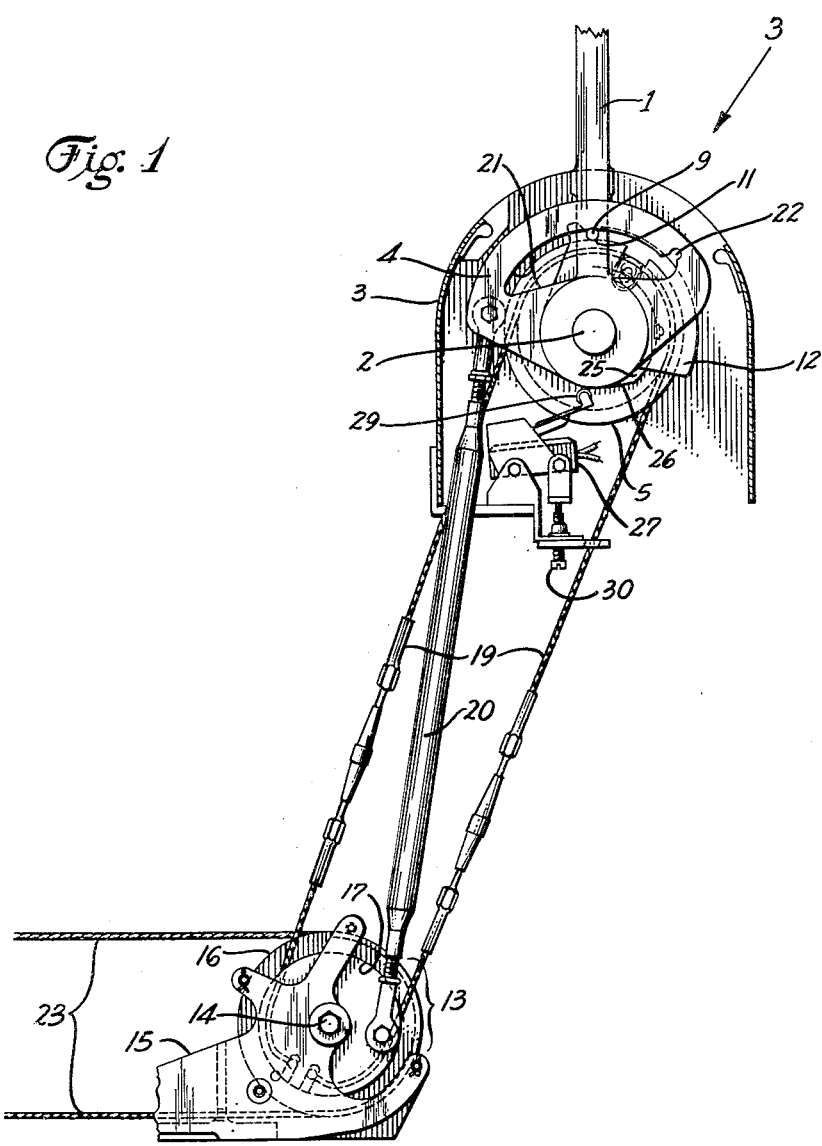
Figure 1 is a side elevation showing a pilot's throttle lever connected through the linkage of the present invention to a throttle actuating cable.

Referring first to Figure 1, a pilot's throttle control lever 1 is mounted for free rotation about a mounting shaft 2 in a pilot's control stand 3. Located adjacent one side of the pilot's lever 1 is a crank 4, also freely rotatable on the mounting shaft 2. A quadrant 5 is similarly installed on the other side of the pilot's lever 1.

As shown in Figure 2, the pilot's lever 1 carries a lifter 6 connected by an internal plunger 7 to a cross pin 9 extending from each side of the pilot's lever near the circumference of the crank 4 and quadrant 5. A tension spring 10, connected to the plunger 7 and the lower side of the pilot's lever 1, urges the lifter 6 and cross pin 9 to a downward position at all times.

In the position shown in Figure 1, the cross pin 9 is engaged in a recess 11 in a plate 12 attached to the quadrant 5. The pilot's lever 1 is thus capable of rotating the quadrant 5 in either direction by means of this cross pin 9.

Beneath the control stand 3 a pulley assembly 13 is rotatably mounted on a pulley pivot 14 fixed to the airplane structure by a support bracket 15. The pulley assembly 13 comprises a large cable pulley 16 and a small cable pulley 17 rigidly fastened to each other. A closed cable assemby 19 is installed around the small cable pulley 17 and the quadrant 5, so that rotation of the quadrant 5 causes pulley rotation in the same direction.

A push rod 20 is pin-connected at its lower end to the rearward side of the small pulley 17 and at its upper end to the forward side of the crank 4. Connection of the push rod 20 in this manner causes rotation of the crank 4 opposite to that of the pulley assembly 13 and, therefore, opposite to that of the quadrant 5.

The crank 4 contains a cut-out portion 21 through which the cross pin 9 projects. An outwardly extending depression 22 at the rear of this cut-out 21 will accommodate the cross pin 9 so that the pilot's lever can be used to rotate the crank directly when the cross pin 9 is engaged in the depression 22.

The large pulley 16 carries a throttle drive cable 23 which leads to the throttle lever on the engine carburetor (not shown). When the pulley assembly 13 is rotated counterclockwise, the engine throttle is opened, and vice versa.

The forward thrust range of the pilot's lever 1 is that which occurs when the cross pin 9 is engaged with the recess 11 in the quadrant plate 12, as shown in Figure 1. In this position, as the pilot's lever is advanced to the left, the quadrant 5 and the pulley assembly 13 will be rotated counterclockwise to open the throttle. The crank 4 will be rotated clockwise by the push rod 20 during this time, and the outside edge of the cut-out 21 will prevent disengagement of the cross pin 9 from the recess 11.

Assume that the pilot's lever 1 is now retarded to the right, closing the throttle. The crank 4 will rotate counterclockwise until the cross pin 9 contacts the rear edge of the cut-out 21. This determines the "throttle closed" position, and the normal engine idling speed occurs at this point. The various lever positions are clearly shown in Figure 3.

The reverse thrust range of the pilot's lever 1 is entered by lifting up on the lifter 6 to raise the cross pin 9 out of the recess 11 in the quadrant plate 12 and into the depression 22 in the crank 4, and moving the lever to the right. The cross pin 9 is now disconnected from the quadrant 5 and connected to drive the crank 4. As the pilot's lever 1 is moved into the reverse thrust range, the crank 4, rotating clockwise, will turn the pulley assembly 13 counterclockwise, through the push rod 20, to again open the throttle. The lifter 6 may be released after the lever is moved into this range, since the cross pin 9 will be held in the depression 22 by the outer rim of the quadrant plate 12, which has been rotated counterclockwise. In returning the pilot's lever to the closed position, the cross pin will automatically drop into the quadrant recess 11 due to the tension spring 10, and the lever is then able to move in the forward thrust range again.

Control means for actuating the propeller pitch reversing mechanism will now be described. A cam 25 is fastened to the lower side of the pilot's lever 1 under the mounting shaft 2. The cam 25 is provided with a beveled end 26 sloping toward its top forward corner. A microswitch 27 with an actuator roller 29 facing upwardly is adjustably mounted in the control stand 3 immediately below the cam 25. As the pilot's lever 1 is moved into the reverse thrust range, the cam beveled end 26 will contact the switch actuator roller 29 and push it downwardly to actuate the microswitch 27.

The microswitch 27, when actuated, energizes an electrical circuit (not shown) to turn the propeller blades into reverse pitch. An adjusting screw 30 is preferably provided to set the microswitch 27 in the desired position to be actuated when the pilot's lever 1 is moved into the reverse thrust range far enough to increase the engine speed to a minimum R. P. M. at which the engine is capable of maintaining operation when the propeller is reversed in flight, thus throwing a higher load on the engine. As the propeller is now in reverse pitch, moving the pilot's lever farther into the reverse thrust range will increase engine speed, as described above, and exert a very effective air brake on the airplane.

The microswitch 27 will remain in the actuated position as the pilot's lever 1 is moved to the extreme end of the reverse thrust range, since the actuator roller 29 will be held down by the constant-radius body of the cam 25. The switch is automatically released when the pilot's lever is moved forward to the same point where actuation took place, and the propeller is thus returned to its forward thrust position.

In the forward thrust range, it is easily seen that a linear relation exists between movement of the pilot's lever 1 and the throttle drive cable 23. At the point where the reverse thrust range is entered, directions of rotation of the quadrant 5 and crank 4 are merely reversed, and a substantially linear ratio of movement is obtained when the pilot's lever 1 drives the pulley assembly 13 by means of the crank 4 and push rod 20. This is due to the fact that the effective moment arms of both ends of the push rod 20 about their respective centers remain substantially equal or proportionate to each other within the reverse thrust operating range.

In this particular embodiment, the entire range of engine throttle positions in the reverse thrust range is accomplished with a lesser movement of the pilot's lever 1 than when in the forward thrust range. This, however, is merely a matter of the radius arms of the ends of the push rod 20, which has little to do with the linearity of motion.

Besides retaining the desired linear ratio of motion in both thrust ranges, the present invention eliminates substantially all backlash and lost motion from the control system during the transition between the two thrust ranges. At the throttle closed position, either direction of pilot's lever movement will result in immediate response of the throttle drive cable 23. The cross pin 9 must be lifted, of course, to enable movement into the reverse thrust range.

In a multiple engine aircraft, this invention obviously can be used by installing a plurality of the units described herein, in adjacent positions, each unit containing duplicate parts, including the microswitch and propeller pitch reversing means. For dual control systems, two pilot's units are easily interconnected to move together.

From the above description it will be apparent that there is thus provided a device of the character described possessing the particular features of advantage before enumerated as desirable, but which obviously is susceptible of modication in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. An engine throttle control comprising a control lever, a forward driving member, a reverse driving member, said control lever and said driving members being rotatably mounted about a common axis, a rotatable driven member, means connecting said forward driving member to said driven member to rotate said driven member in the same direction as said forward driving member, means connecting said reverse driving member to said driven member to rotate said driven member in the opposite direction from said reverse driving member, one of said driving members including means defining a substantially radial recess notched inwardly toward its center, the other of said driving members including means defining an opening between the center of said other driving member and its perimeter, said opening having a substantially radial depression notched outwardly toward said perimeter, said opening being co-radial with said recess and said depression being at a greater distance from said axis than is said recess, and a movable engagement member carried by said control lever, said engagement member being connectable in driving relationship with said one driving member when moved toward said axis to engage in said recess and connectable in driving relationship with said other driving member when moved away from said axis to engage in said depression, whereby the throttle of an engine, operatively connected to said driven member, may be opened and closed by movement of said control lever on either side of a neutral position occupied by said throttle control where said depression is radially aligned with said recess.

2. Apparatus in accordance with claim 1 wherein said driven member is connected to rotate substantially linearly with respect to rotation of said driving members within the position range of said throttle.

3. Apparatus in accordance with claim 1 including external circuit actuating means automatically and continuously actuated by said control lever when in any position on one side of said neutral position and non-actuated when said control lever is in any position on the other side of said neutral position, said circuit actuating means being adapted to control a separate power means.

4. Apparatus in accordance with claim 1 wherein said depression is at one end of said opening, the outer edge of said one driving member adjacent said recess forms an arc of radius about said axis, and the outer side of said opening forms an arc of radius about said axis, said radii being substantially equal, whereby said engagement member is prevented from leaving said driving relationship with said recess or said depression except at said neutral position.

5. Apparatus in accordance with claim 1 wherein said engagement member is a pin or the like extending crosswise of said control lever and intersecting the planes of rotation of said driving members, said pin being adapted to be moved back and forth on said control lever along a radius thereof by manual pin-moving means.

6. Apparatus in accordance with claim 1 wherein first said connecting means comprises a closed cable assembly or the like attached around said forward driving member and around said driven member, and second said connecting means comprises a rigid rod assembly rotatably connected to said driven member and to said reverse driving member at points on opposite sides of the rotational axes thereof.

7. An engine throttle control comprising a control lever, a rotatable forward driving member, a rotatable reverse driving member, a rotatable driven member, means connecting said forward driving member to said driven member to rotate said driven member in the same direction as said forward driving member, and means connecting said reverse driving member to said driven member to rotate said driven member in the opposite direction from said reverse driving member, said control lever being connectable with said forward driving member to move said forward driving member between limiting positions throughout a range of control lever positions on one side of a "throttle closed" lever position and connectable with said reverse driving member to move said reverse driving member between limiting positions throughout a range of control lever positions on the other side of said "throttle closed" position, whereby the throttle of an engine may be opened and closed by operatively connecting it to said driven member, said control lever and said driving members all being rotatably mounted about a common axis.

CHARLES E. OATES.

REFERENCES CITED

The following references are of record in the file of this patent:

UNITED STATES PATENTS

| Number | Name | Date |
|--------|------|------|
| 1,527,247 | Brillon | Feb. 24, 1925 |
| 2,154,887 | Baker | Apr. 18, 1939 |
| 2,179,492 | Caldwell | Nov. 14, 1939 |
| 2,289,654 | Keel | July 14, 1942 |
| 2,406,872 | Waite | Sept. 3, 1946 |
| 2,430,363 | Parkes | Nov. 4, 1947 |
| 2,446,700 | Giles | Aug. 10, 1948 |
| 2,454,485 | Snell | Nov. 23, 1948 |